United States Patent [19]

Farnand et al.

[11] Patent Number: 5,274,732
[45] Date of Patent: Dec. 28, 1993

[54] MOUNT FOR LINEAR LENS ARRAY

[75] Inventors: Stephen J. Farnand, Rochester; Yee S. Ng, Fairport, both of N.Y.

[73] Assignee: Eastman Kodak Company, Rochester, N.Y.

[21] Appl. No.: 817,164

[22] Filed: Jan. 6, 1992

[51] Int. Cl.⁵ .............................. G02B 6/32
[52] U.S. Cl. ..................... 385/136; 385/33; 385/34; 359/811; 359/813
[58] Field of Search ............... 385/33, 34, 120, 124, 385/136; 359/811, 813, 819, 820

[56] References Cited

U.S. PATENT DOCUMENTS

| | | | |
|---|---|---|---|
| 2,056,693 | 10/1936 | Stanley | 359/811 X |
| 3,658,407 | 4/1972 | Kitano et al. | 350/96 B |
| 4,462,662 | 7/1984 | Lama | 385/124 X |
| 4,715,682 | 12/1987 | Koek et al. | 350/253 |
| 4,821,051 | 4/1989 | Hediger | 346/155 |
| 4,875,057 | 10/1989 | Hediger et al. | 346/107 R |
| 4,896,168 | 1/1990 | Newman et al. | 346/107 R |
| 4,913,526 | 4/1990 | Hediger | 350/252 |
| 4,917,453 | 4/1990 | Block et al. | 385/33 |
| 4,928,139 | 5/1990 | Barton et al. | 355/1 |
| 5,036,339 | 7/1991 | Hediger | 346/107 R |
| 5,166,999 | 11/1992 | Rees et al. | 385/120 |

Primary Examiner—Rodney B. Bovernick
Assistant Examiner—Stephen W. Barns
Attorney, Agent, or Firm—Norman Rushefsky

[57] ABSTRACT

An optical assembly for an LED printhead includes a longitudinally extending linear lens array. A stiffener bar is attached to the lens array along a substantial longitudinal dimension of the lens array. A lens mount base plate supports the stiffener bar and a pin and slot connection is provided for permitting thermally induced dimensional change in two dimensions of the stiffener bar relative to the lens mount base plate.

16 Claims, 3 Drawing Sheets

MOUNT FOR LINEAR LENS ARRAY

BACKGROUND OF THE INVENTION

1. Field of the Invention

The present invention relates to optical print heads and to means for transmitting light emitted from the print heads to a photosensitive surface, and more particularly to means for accurately aligning the transmitting means and the print head to maintain high resolution and good exposure uniformity.

2. Description of the Prior Art

High speed optical printing devices used in data processing systems are intended for converting electric input signals into printed form, and include photosensitive means and light sources such as linear arrays of light emitting diodes (LEDs), photodiodes, or similar devices. Light from a source is typically transmitted to the photosensitive means via a plurality of gradient index optical fibers forming an imaging lens array. Such imaging lens arrays are commercially available as Selfoc (a trademark of Nippon Sheet Glass co., Ltd.) lenses in a staggered two-row bundle of optical fibers as described in U.S. Pat. No. 3,658,407, patented on Apr. 25, 1972. Reference may be made to that patent for details of the lens arrays.

In printheads of the type referred to herein, the LEDs are arranged in a linear array of LEDs having a designed density to provide a resolution of a predetermined number of dots per inch. In addition, they have a Selfoc lens assembly supported over the LED array to provide a modular unit which can be prefocused and mounted upon a suitable reproduction apparatus. These lenses comprise a plurality of fiber optic filaments bundled together to from a linear array having dimensions approximating the dimensions of the LED array. Because of the preciseness required in high resolution printheads of both the LED array and the lens assembly, special mounting precautions must be taken to insure stress and distortion-free performance of the printhead over a wide temperature range.

One requirement in such printheads is to maintain the lens assembly as straight as possible. U.S. Pat. No. 4,715,682 illustrates one method by which the lens assembly can be kept straight. According to that patent, a linear fiber optic imaging lens array is mounted on the print head and fixed in place after alignment of the array in the Y and Z directions. As noted in the patent, the coefficient of thermal expansion of the imaging lens array and stiffeners attached thereto may differ from that of the printhead, and must be accounted for in the design of the mounting means. To this end the patent suggests that the printhead provide for thermal expansion after the imaging lens array has been properly aligned with and spaced from the LED array. This is accomplished by use of a flexible plate against which an arm of one of the stiffeners can expand against to thus allow expansion in the X direction of the array while movement in the Y and Z directions is constrained.

A problem with this approach is that where the temperature coefficient of the stiffener bar is different from the printhead there are different thermal expansions in say the Y direction that are not relieved and this can cause undesired distortion of the lens array.

It is therefore an object of this invention to provide an improved support for the linear lens array that overcomes thermal problems associated with supports known on the prior art.

SUMMARY OF THE INVENTION

These and other objects of the invention are realized by a optical assembly that includes a longitudinally extending linear lens array. A lens array stiffener bar is attached to the lens array along a substantial longitudinal dimension of the lens array. A lens mount base plate supports the stiffener bar thereon, and connecting means is provided for connecting and permitting thermally induced dimensional change of the stiffener bar relative to the lens mount base plate, said means including a pin and slot connection between said stiffener bar and lens mount base plate.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENTS

Figure 1:
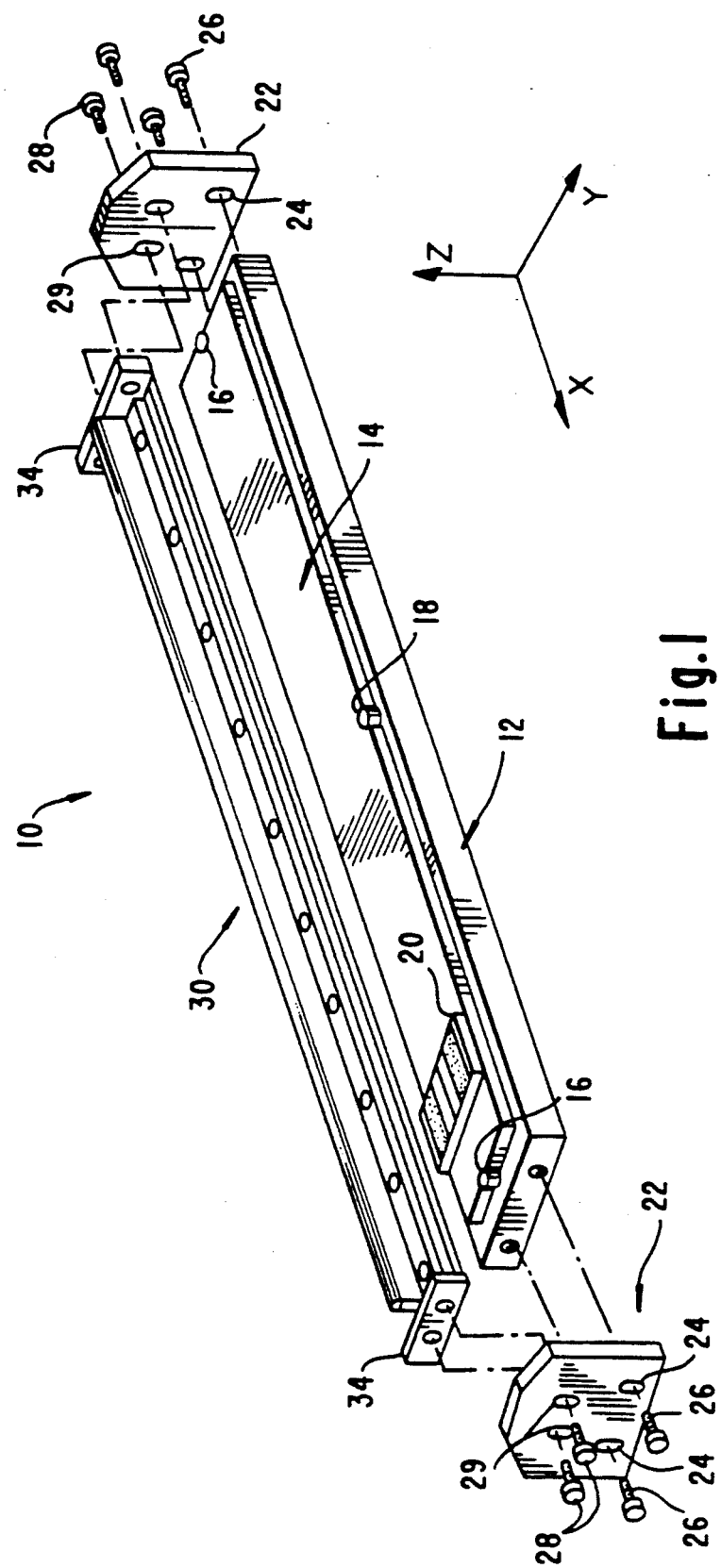
FIG. 1 is a perspective view of a printhead that includes a linear lens array mount assembly made in accordance with the invention.

Throughout the following description, similar reference characters refer to similar elements or members in all of the figures of the drawings.

Referring now to the drawings, and to FIG. 1 in particular, there is shown a printhead (10) constructed according to this invention. The printhead (10) includes a longitudinally extending base plate (12) that is mounted or may form a part of a heat sink assembly not shown. Supported on the base plate is a longitudinally extending tile carrier board (14). The tile carrier board is attached to the printhead base plate by a suitable adhesive that is heat conductive. At each of the two longitudinal ends of the tile carrier board a pair of notches are provided to allow an upstanding pin (16) from the base plate to be located within each notch. An additional notch is provided with a side edge of the tile carrier board at the center of the edge to allow a third pin (18) from the printhead base plate to be located therein. The pins allow thermal expansion of the tile carrier board relative to the array in the X, Y plane similar to that described in U.S. Pat. No. 4,821,051 the contents of which are incorporated herein by this reference. The tile carrier board has mounted thereon a series of tiles (20), only one of which is shown. The series extends in the longitudinal (X-direction) of the printhead with the tiles mounted side to side. On each tile there is mounted one or more LED chip arrays. Each array includes a plurality of LEDS and the arrays are mounted end to end so that a single row of LEDs is formed along the middle of the tile. With the tiles mounted edge to edge a single row of LEDS is formed on the printhead. To either side of the row of LEDS there may be provided on each tile driver chips which are integrated circuits for providing driving current to the LEDS. The tiles also include circuit boards or spreader boards for distributing signals to the driver chips. The tiles are attached to the tile carrier board with a suitable heat conductive adhesive and comprise a module that may be tested before mounting on the tile carrier board.

At each end of the printhead (10) there are provided lens support brackets (22) having apertures (24) through which screws (26) pass and attach the brackets to the printhead base plate (12). As an example, the lens support brackets and printhead base plate may be made of aluminum to provide good heat conductivity. The tile carrier board (14) and tiles (20) may be formed of stainless steel or other composition which provides a similar temperature coefficient of expansion to the LED arrays which, in this example, are gallium arsenide. In lieu of stainless steel, another composition for the tile carrier board may be an alloy comprising tungsten 89%, copper 9%, and nickel 2%. The lens support brackets (22) support the lens mount assembly (30) which is coupled to the brackets using screws (28) as shown which pass through holes (29) in the brackets and are screwed into holes (32) in arms (34) formed at the longitudinal ends of a lens mount base plate (36) of the lens mount assembly (30). The holes (29) may be made oblong to allow adjustment of the lens in the Z direction. The particular way of mounting the assembly (30) to the brackets is not critical to the invention and is exemplary. Other ways known in the prior art may be selected.

Figure 2:
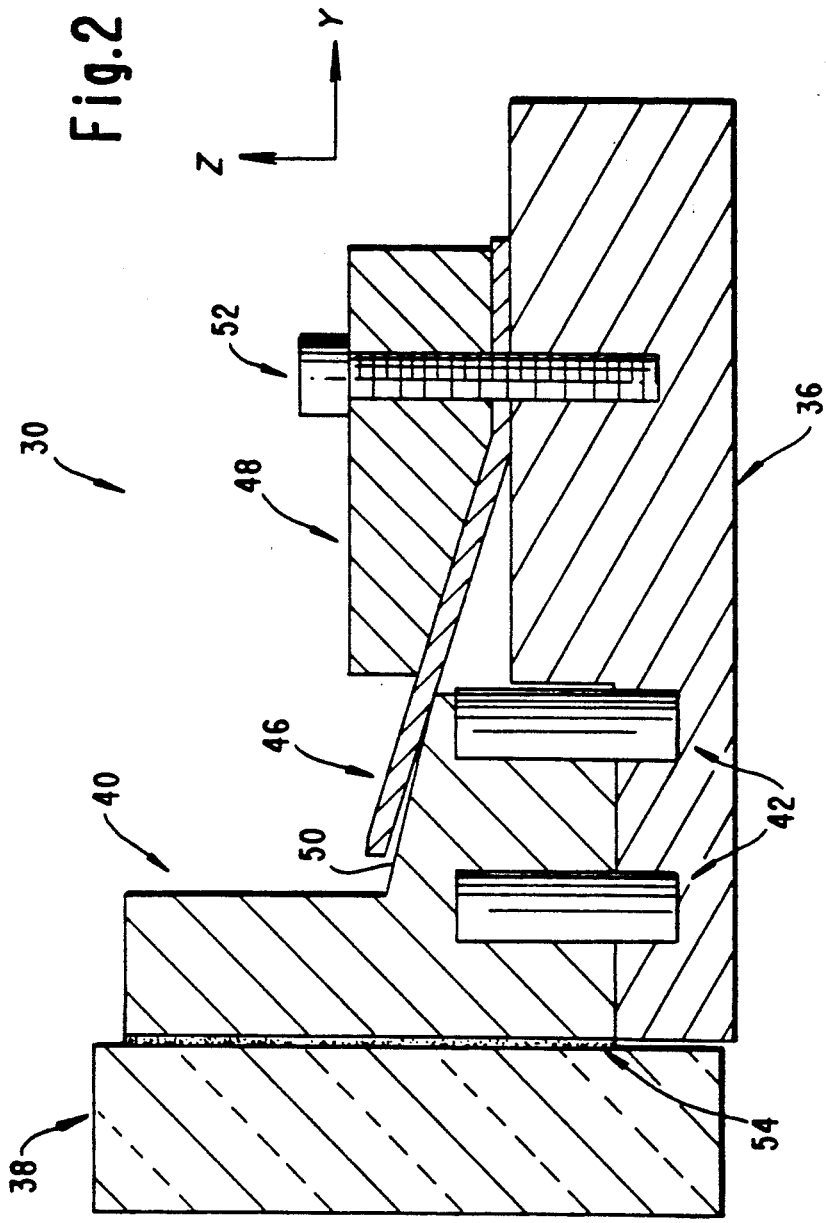
FIG. 2 is a schematic of a transverse section of the linear lens array mount assembly of FIG. 1 and taken along the line 2—2 of FIG. 3
Figure 3:
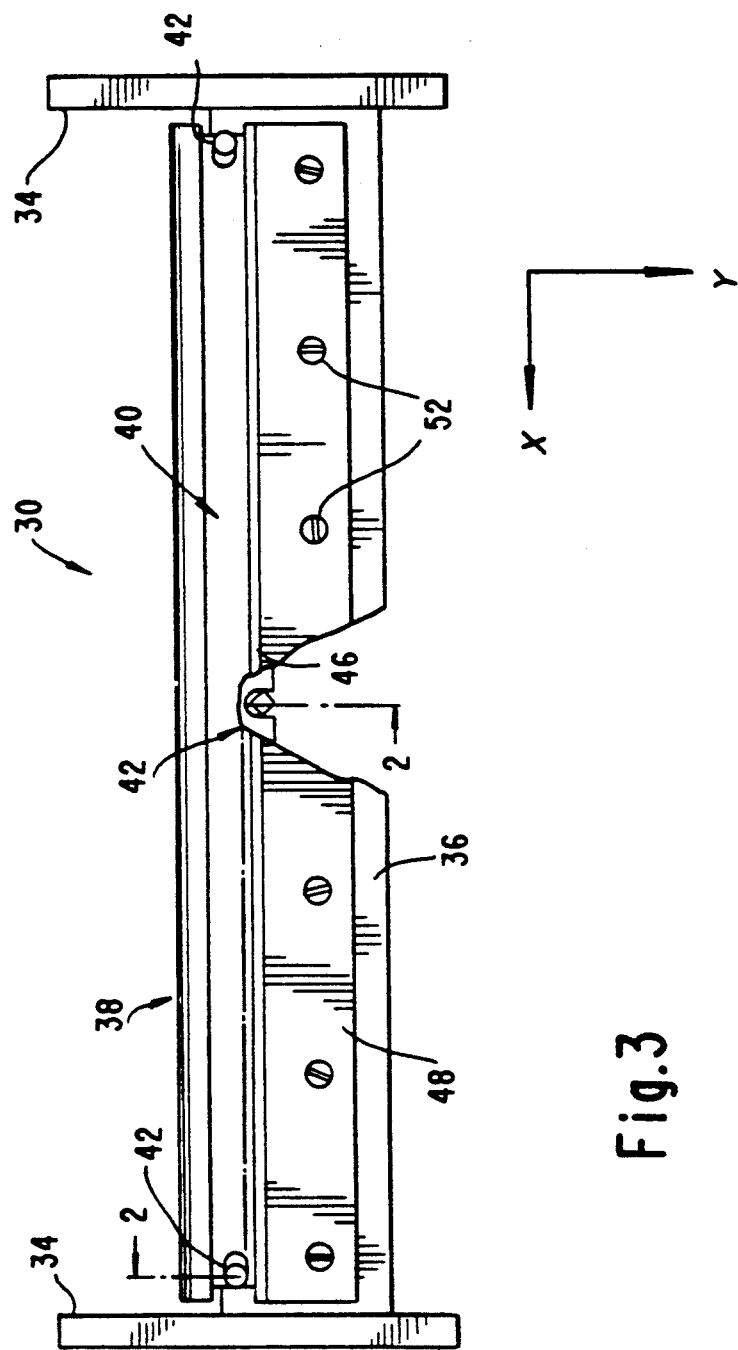
FIG. 3 is a top plan new of the linear lens array mount assembly of FIG. 2 and shown partially cut away.

With reference now to FIGS. 2 and 3 a description of the lens mount assembly (30) shown therein will now be made. The Selfoc or linear gradient index fiber lens array (38) includes a plurality of gradient index optical fibers which are housed or encased in a linear or elongated housing. The lens array can be a commercially available product manufactured by Nippon Sheet Glass Company, Ltd. under the trademark name of SELFOC.

In accordance with the invention this technique for mounting the Selfoc lens array on an LED printhead provides for the thermal expansion and contraction differences between the Selfoc lens array and lens mount hardware. The Selfoc lens array is supported by a lens stiffener bar (40). The lens stiffener bar has three slots or notches (42) which align with capture pins (44) formed on the lens mount base plate (36), one in the center and one on at each end of the lens stiffener bar. These slots allow the Selfoc lens array and stiffener bar to thermally expand and contract evenly from the center outward in both the X and Y directions. This combination of lens array and lens stiffener bar is held in place by a leaf spring (46) that is contained by a spring bracket (48). The leaf spring (46) extends for the full length of the lens stiffener bar (40) and has a portion thereof that rests upon a ledge (50) of the stiffener bar under a spring bias. The spring bracket (48) extends for the full length of the leaf spring and overlies a portion of same. The spring bracket is held in place by cap head screws (52) that pass through holes in the spring bracket and leaf spring and attach the spring bracket (48) and leaf spring to the lens mount base plate (36).

The lens stiffener bar (40) will have a coefficient of thermal expansion similar to that of the Selfoc lens array. for example, the stiffener bar can be made of tungsten (coefficient of exp. $=4.5\times 10^{-6}$ per ° C.) which reasonably approximates the thermal expansion of a Selfoc lens array (coefficient of exp. $=3\times 10^{-6}$ per ° C.). The Selfoc lens array and lens stiffener bar are then able to thermally expand and contract independently of the lens mount hardware and with minimal mechanical interference. This method of capturing the Selfoc lens array will also minimize lens distortion caused by a mechanical bind due to a thermal mismatch between the lens stiffener and the support hardware. The material used for the lens stiffener bar (40) and the lens mount base plate (36) can have different thermal expansion coefficients. The lens mount base plate for example can use material of good thermal conductivity which matches the printhead base plate material (i.e. aluminum) while the lens stiffener bar can use a material that matches the thermal expansion coefficient of the Selfoc lens array. The lens stiffener extends approximately the full length of the Selfoc lens array. A heat conductive adhesive (54) attaches one face of the Selfoc lens array to the stiffener bar. The adhesive may be a two component epoxy such as Omegabond 101 that is available from Omega Engineering, Inc. of Stamford, Conn. Thus, the temperature gradient is reduced between the Selfoc lens array and the LED tile modules by having thermal coupling of the Selfoc lens to the mount assembly and the mount assembly to the printhead base plate.

Another approach to dealing with the problem of thermal mismatch affecting the Selfoc lens array is to use a lens stiffener bar (40) with a thermal coefficient of expansion similar to that of the printhead tile carrier board (14). The adhesive (54) that joins the Selfoc lens array (38) to the stiffener bar can withstand the mismatch between the two (Selfoc lens array and stiffener bar). Thus, where the adhesive such as the one of the type identified above has an ability to withstand high tensile forces the Selfoc lens array may be stretched to expand with the lens stiffener bar. The printhead tile carrier board (14) has a thermal coefficient of expansion similar to that of the GaAs LED arrays (See for example, U.S. Pat. No. 4,875,057 to Hediger et al). The Selfoc lens array when stretched with the stiffener bar (40) will thermally expand and contract at a rate close to that of the LED emitters. This will also allow the lens array to be thermally coupled back to the printhead base plate via the lens mount base plate (36) thereby reducing positional error due to thermal expansion effects. This approach minimizes inconsistencies in the measured brightness uniformity of an LED array verses the actual brightness uniformity at the film plane due to differences in the thermal expansion between the Selfoc lens array and the GaAs emitters. This can be understood by recognizing that light from each LED is collected and focused by a plurality of fibers in the Selfoc lens array. For some LEDs it may be for example 5 fibers for others 6 or portions thereof. If the Selfoc lens and LED chips expand at different rates it will mean that for a particular LED that its light is being collected by a different effective amount of lens area. It is known to control uniformity of each LED's light output with temperature by adjusting say data thereto for a grey level printhead, i.e. multibit exposure capability, but this may not take into account shifting of the lens relative to the LEDs. Once again the lens stiffener bar (40) and the printhead base plate (12) can be made of different materials. The lens mount base plate (36) for example can use material of good thermal conductivity, such as aluminum, which matches the printhead base plate while the lens stiffener bar can use a material that matches the thermal expansion coefficient of the tile carrier board, such as stainless steel.

The invention has been described with reference to illustrative preferred embodiments but variations and modifications are possible within the spirit and scope of the invention as defined by the following claims.

We claim:

1. An optical assembly, which comprises:
   a longitudinally extending linear lens array;
   a lens array stiffener bar attached to the lens array along a longitudinal dimension of the lens array;
   a lens mount base plate supporting the stiffener bar thereon; and
   connecting means for connecting and permitting thermally induced dimensional change in two dimensions of the stiffener bar relative to the lens mount base plate, said means including a first pin and slot connection between said stiffener bar and lens mount base plate allowing said dimensional change in one of said two dimensions and a second pin and slot connection between said stiffener bar and lens mount base plate allowing said dimensional change in a second of the two dimensions.

2. The optical assembly of claim 1 and including resilient means for resiliently biasing the stiffener bar towards the lens mount base plate.

3. The optical assembly of claim 2 and wherein the resilient means includes a leaf spring that extends for a substantial longitudinal dimension of the stiffener bar.

4. The optical assembly of claim 2 and wherein the lens array is comprised of a plurality of optical fibers.

5. The optical assembly of claim 4 and wherein the resilient means includes a leaf spring that stiffener bar is approximately the same as that of the lens array.

6. The optical assembly of claim 1 and wherein the coefficient of thermal expansion of the stiffener bar is approximately the same as that of the lens array.

7. The optical assembly of claim 6 and wherein the lens array is comprised of a plurality of optical fibers.

8. The optical assembly of claim 1 and wherein the lens array is comprised of a plurality of optical fibers.

9. The optical assembly of claim 1 in combination with a plurality of light-emitting elements and support means for supporting the elements and lens array so that light from the elements is focused by said lens array.

10. The optical assemlby of claim 9 and wherein the support means includes a base plate structure that is of the same metal composition as the lens mount base plate.

11. The optical assembly of claim 9 and including means for thermally coupling the lens array to said support means for supporting the elements.

12. An optical assembly, which comprises:
   a linear gradient index fiber optic lens array having a longitudinal dimension;
   a stiffener bar adhesively attached to the lens array along the longitudinal dimension;
   a support means for supporting the stiffener bar and thermally coupled thereto for removing heat energy from the stiffener bar;
   a pin and slot connection means between the support means and the stiffener bar for permitting dimensional change of the bar relative to the support means and
   resilient means for urging the support means and stiffener bar into engagement.

13. The optical assembly of claim 12 and wherein the resilient means is a leaf spring.

14. The optical assembly of claim 13 and wherein the pin and slot connection means permits two dimensional change of the stiffener bar relative to the support means.

15. The optical assembly of claim 12 and wherein the resilient means is a leaf spring that extends in the longitudinal dimension at least for a substantial portion of the length of the stiffener bar.

16. The optical assembly of claim 12 and wherein the coefficient of thermal expansion of the stiffener bar is approximately the same as that of the lens array.

* * * * *